J. FRANKLIN.
TROLLEY.
APPLICATION FILED MAY 1, 1907.
907,984.
Patented Dec. 29, 1908.
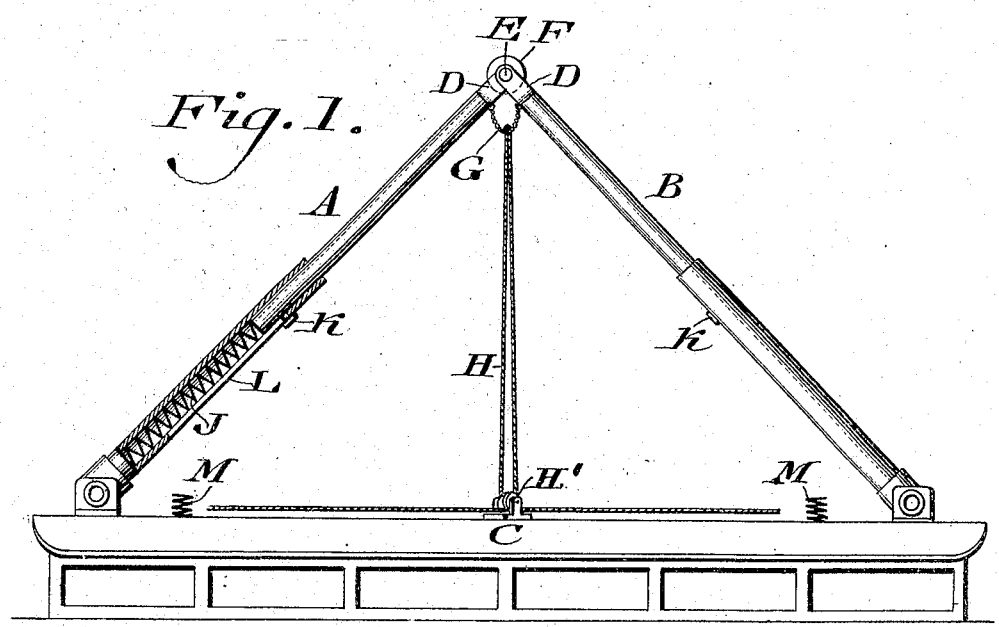
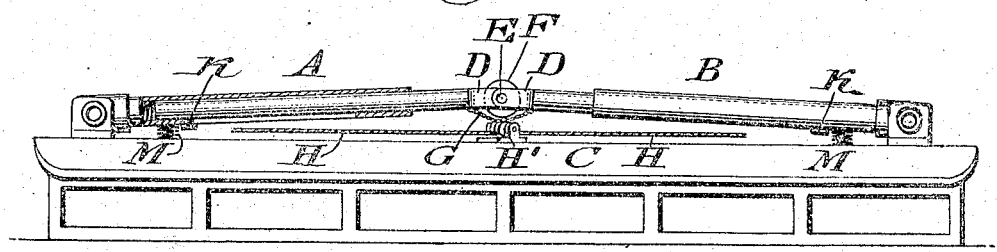
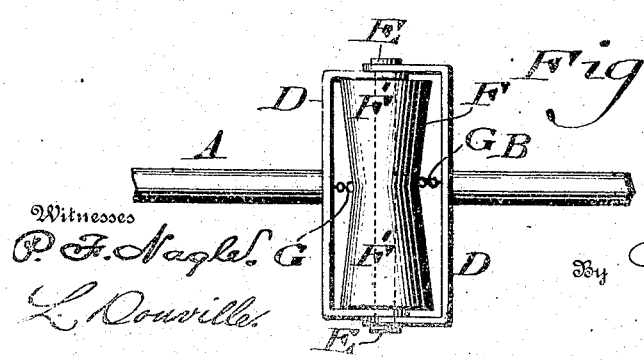
Witnesses
P. F. Nagle
L. Douville
Inventor
Joseph Franklin
By Wiershein + Fairbank
Attorneys

UNITED STATES PATENT OFFICE.

JOSEPH FRANKLIN, OF PHILADELPHIA, PENNSYLVANIA.

TROLLEY.

No. 907,984.   Specification of Letters Patent.   Patented Dec. 29, 1908.

Application filed May 1, 1907. Serial No. 371,325.

*To all whom it may concern:*

Be it known that I, JOSEPH FRANKLIN, a citizen of the United States, residing in the city and county of Philadelphia, State of Pennsylvania, have invented a new and useful Trolley, of which the following is a specification.

My invention relates to improvements in a car trolley, and consists of a plurality of poles, on which the trolley wheel is mounted, and means permitting said poles to be lowered to the fullest possible extent, when occasion requires the same, said poles having their upper members prevented from turning and twisting and also adapting a car to be run in opposite directions without the necessity of reversing the trolley.

It further consists of a trolley wheel or roller adapted to prevent jumping of the same from the wire or conductor, and permit it to be conveniently applied to the latter.

Figures 1 and 2 represent partial side elevations and partial longitudinal sections of a trolley car embodying my invention, the members of the same being in different positions. Fig. 3 represents a plan view of a detached portion of the same on an enlarged scale.

Similar letters of reference indicate corresponding parts in the figures.

Referring to the drawings: A and B designate trolley poles pivotally mounted on the roof C of a car, respectively at the front and rear ends thereof, said poles projecting towards each other and being joined at the inner ends by means of the frames or ears D, which are secured to the poles and the bolt or shaft E, which is passed through the sides of said ears and through the roller or wheel F of the trolley, said roller thus having a common axis on said poles, at what may be termed the center.

Connected with the ears D, is the chain or piece G of flexible material, the same depending from the former and having attached to it the ropes H, by which said poles, and consequently, the wheel F may be lowered, said ropes passing around the pulleys H' on the roof of the car as usual, it being noticed that each pole is formed of telescopically fitted members, whereby it may be lengthened and shortened and so assume the position at which it may be placed, either raised or lowered.

Within the tubular member of each pole is the spring J, which latter bears against the adjacent end of the other member and so forces out the latter and consequently elevates the wheel F, this being limited by the stop pin or stud K; which passes through the slot L in the outer member of a pole and is secured to the inner member thereof, it being adapted to abut against the end of said slot as a stop, said pins also preventing rotation and twisting of the sliding members of the poles, especially when in lowered position.

It will be seen that when the roller or wheel is to be lowered, the ropes H are drawn as usual, whereby the poles contract or reduce in length and turn towards each other and descend, carrying the wheel or roller with it, and allowing the latter and said poles to be folded close to the roof of the car and the pulleys H', a matter of importance in cases where there is but little space left between said poles and wheel or roller and the roof of a tunnel, low arch, etc., it being also noticed that the connection G of the cords H, owing to its flexible and yielding nature, presents no serious obstacle to the full, or approximately full, descent of the poles and wheel or roller, as apparent in Fig. 2.

When the poles are to be raised, they are started by the springs M, which are mounted on the roof and bear upwardly against the underside of the lower portions of the poles, the effect of which is evident.

In order to prevent the wheel or roller from jumping the wire or conductor, while also causing it to be conveniently located on the latter when the poles are raised and remain in operative position, I form said wheel or roller of two truncated cones F', F' joined at their narrow ends, which is at the center of the wheel or roller, thus rendering the latter of considerable width and making the change in the diameter of the same gradual, whereby the wheel or roller is prevented from abruptly leaving the wire or conductor, while on the contrary it is retained engaged with the same with greater certainty.

It will be seen that the chain or piece G hangs from the ears D below the center of the roller F, and as the latter has its reduced diameter at said center, said chain or piece G in the lowering motions of the poles, stretches out and only contacts with said center when the roller has reached its lowest point, so that the binding with and rubbing of said chain or piece on said center as the roller descends is avoided and the roller may descend comparatively to full extent without being retarded by the struck-out or taut chain, it then resting on the pulleys H' without having previously interfered with the rotation of the latter. Again, owing to the plurality of poles, which extend respectively towards each other from front to center and vice versa, the trolley may be said to be double-ended, and thus the car may be run in opposite directions without the necessity of reversing the trolley.

While I have specified certain means for carrying out my improvements, I do not wish to be limited exactly to the same, but desire to make such changes as may come within the scope of the novelty involved.

Having thus described my invention, what I claim as new and desire to secure by Letters Patent, is:

1. In a car trolley, a pole formed of a plurality of telescopic members, one of which is directly pivotally mounted on the car, and the other slidably fitted to the pivotally-mounted member, coöperating means on said members to limit the telescopic movement in both directions and to prevent rotation and twisting of the members, a roller mounted between the adjacent ends of the adjacent members and oppositely tapered from its ends toward the center, a flexible piece having its ends freely connected to adjacent members and pendent therefrom in line with the smaller diameter of said roller, guiding means for ropes on the car between the pivots of the pole members, and ropes passed under said guiding means and loosely engaged over said pendent piece opposite the smaller diameter of said roller whereby binding with or rubbing of said piece against the roller is prevented as the roller descends.

2. The combination with the pivotally mounted telescopic members, of ears supported at the adjacent ends thereof, a roller mounted therein, a flexible member depending from said ears below the center of said roller, pulleys supported beneath the said roller, and a rope coöperating with said pulleys, said roller being reduced in diameter at its center and said pulleys arranged in vertical alinement with said flexible member whereby contact of said flexible member with the roller is prevented as the roller descends.

JOSEPH FRANKLIN.

Witnesses:
 JOHN A. WIEDERSHEIM
 HARRY C. DALTON.